Danl. B. Westfall.
Potato Digger.

No. 104518 — Patented Jun 21 1870

Witnesses.

Inventor.

UNITED STATES PATENT OFFICE.

DANIEL B. WESTFALL, OF LYONS, NEW YORK.

IMPROVEMENT IN POTATO-DIGGERS.

Specification forming part of Letters Patent No. 104,518, dated June 21, 1870.

*To all whom it may concern:*

Be it known that I, DANIEL B. WESTFALL, of Lyons, in the county of Wayne, and in the State of New York, have invented certain new and useful Improvements in Potato-Diggers; and I do hereby declare that the following is a full, clear, and exact description thereof, reference being had to the accompanying drawings, making a part of this specification, in which—

Figure 1:
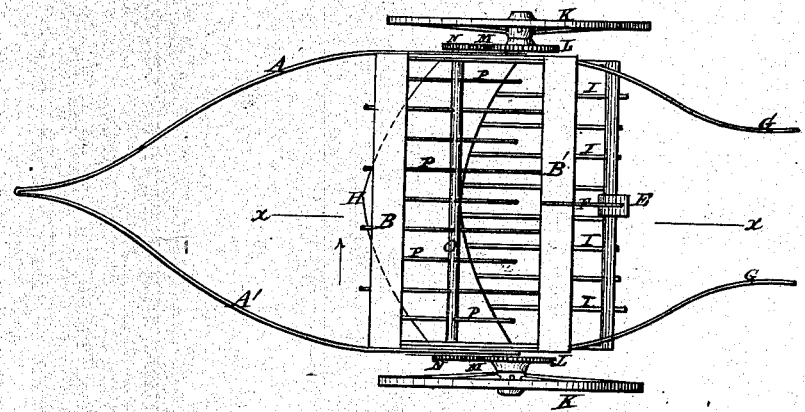
Figure 2:
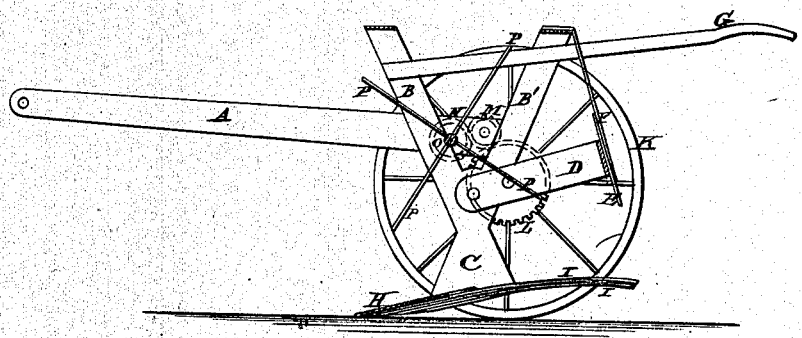

Figure 1 is a plan view of the upper side of my invention, and Fig. 2 is a vertical longitudinal section of the same.

Letters of like name and kind denote like parts in each figure.

My invention is an improvement upon a class of devices used for raising potatoes from within hills or rows to the surface of the ground; and it consists in the peculiar construction and arrangement of the various parts of the device, by means of which the desired operations are performed in a most thorough and satisfactory manner.

In the annexed drawings, A and A' represent the side pieces of the frame, constructed of sheet metal, and joined together at their front ends, from whence they extend in a curve outward and rearward to a point in line with the front of the traction-wheels, and from thence rearward in parallel lines, their rear ends being secured to or upon two braces, B and B', which, having a general form of three sides of a square, are secured together near their lower ends in the form of a cross, from thence pass diagonally upward to the desired height, and then extend horizontally across to the opposite side. If desired, the braces B and B' may be constructed of sheet metal, and cut together from one piece.

D represents a bar of metal having its ends turned inward at a right angle, and at a sufficient distance apart to permit them to pass over the outside of the braces B and B', to the center, transversely, of which said ends are pivoted. The bar D is secured in position and made vertically adjustable by means of a plate, E, attached to its center lengthwise, and provided with a series of holes, which engage with a pin upon the end of a spring, F, attached at its upper end to or upon the center of the brace B'. Secured at its sides to the lower ends of the braces B and B' is a share, H, having the form shown in Fig. 1, and made convex upon its upper side, so as to raise the rear side at its center lengthwise somewhat above the ground. A series of tines, I, formed of small round metal rods, are attached at equidistant points upon the under side of the share H, and project rearward from and in line with the same.

The frame is supported by means of two traction-wheels, K, which are suitably journaled upon the bar D near its forward ends, so that by adjusting said bar or pivoted frame up or down, the relative position of the main frame is correspondingly changed, and the depth of the share regulated.

Journaled at its ends within the side pieces, A and A', is a shaft, O, having secured to and projecting radially from that portion between said side pieces a number of rods, P. A rotary motion is imparted to said shaft, when the machine is in operation, by means of a gear-wheel, L, secured to the inner end of each wheel-hub, and meshing with a pinion, M, pivoted upon the outer face of each side piece, and in turn meshing with a pinion, N, attached to each end of said shaft.

Two handles, G, secured to the inner faces of the braces B and B', and from thence projecting rearward, inward, and slightly upward, complete the device, the operation of which is as follows: Being adjusted to the necessary depth, the share is caused to pass beneath and raise the hills or rows of potatoes, which, being passed backward, are separated from the soil and deposited upon the top of the ground, said soil being sifted through the tines, while the potatoes pass over the same.

The operation of disengaging the potatoes from the soil and from each other is greatly facilitated by the action of the rods P, which, projecting from the shaft O sufficiently to cause their ends to pass near the surface of the share, when said shaft is revolved, catch the potato-vines and break them from the potatoes, by which operation such potatoes as adhere to said vines are drawn upward from and deposited upon the surface of the soil.

Having thus fully set forth the nature and merits of my invention, what I claim as new, and desire to secure by Letters Patent, is—

1. The hereinbefore-described potato-digger, consisting of the frame formed of the side pieces, A A', and the diagonal braces B and B', the pivoted arms D, the plate E, the spring-catch F, the handles G, the share H, provided with the tines I; the traction-wheels K, the gears L, M, and N, and the shaft O, provided with the radial rods P, all constructed and arranged to operate substantially as and for the purpose specified.

2. The means employed for adjusting the height of the frame and share, consisting of the pivoted frame D, the perforated plate E, and the spring-catch F, substantially as and for the purpose set forth.

In testimony that I claim the foregoing I have hereunto set my hand this 31st day of January, A. D. 1870.

D. B. WESTFALL.

Witnesses:
 WILLIAM KREUTZER,
 GEORGE T. KENT.